United States Patent [19]
Garnsworthy

[11] Patent Number: 5,983,685
[45] Date of Patent: Nov. 16, 1999

[54] ANTITHEFT MOTOR VEHICLE ANCHOR AND METHOD

[76] Inventor: David Garnsworthy, Dereeny, Whitegate, County Clare, Ireland

[21] Appl. No.: 09/040,428

[22] Filed: Mar. 18, 1998

[51] Int. Cl.[6] ........................................... B62H 5/08
[52] U.S. Cl. .................. 70/234; 211/8; 52/165; 70/237
[58] Field of Search ............... 70/233–235, 237; 211/5, 8; 52/165

[56] References Cited

U.S. PATENT DOCUMENTS

| | | | |
|---|---|---|---|
| 605,628 | 6/1898 | Bradley | 70/234 |
| 834,954 | 2/1906 | Long | 70/234 |
| 1,470,198 | 10/1923 | Miller et al. | 70/234 |
| 3,845,643 | 11/1974 | Barrett . | |
| 3,918,279 | 11/1975 | Williamson | 70/234 |
| 3,934,436 | 1/1976 | Canolin et al. | 211/5 |
| 3,944,079 | 3/1976 | Boslough | 70/234 |
| 4,050,583 | 9/1977 | Szabo | 70/234 |
| 4,269,049 | 5/1981 | Henderson | 70/234 |
| 4,373,303 | 2/1983 | Stratichuk | 52/165 |
| 5,070,646 | 12/1991 | Colombo | 49/49 |
| 5,137,121 | 8/1992 | Leonard . | |
| 5,385,038 | 1/1995 | Walker . | |

FOREIGN PATENT DOCUMENTS

| | | | |
|---|---|---|---|
| 0034554 | 8/1981 | European Pat. Off. | 70/234 |
| 0176973 | 9/1985 | European Pat. Off. . | |
| 2402574 | 5/1979 | France | 70/235 |
| 2211233 | 6/1989 | United Kingdom | 70/234 |
| 2236513 | 4/1991 | United Kingdom | 70/14 |

*Primary Examiner*—Darnell M. Boucher

[57] ABSTRACT

An antitheft motor-vehicle anchor (1, 28, 35) is affixed immovably to a surface position (30) proximate a parking place and has a break-resistant connecter(7, 9, 10, 31, 33, 36, 37) that is lockable to a wheel (14), frame and/or axle of a motor vehicle or vehicular unit to prevent its theft by being carried, towed or pushed away. The break-resistant connector can be retractable or otherwise raised to and lowered from or optionally fixed in a locking or clamping position. Either a fixed or a retractably raised and lowered embodiment can be used as a locking motorcycle stand. A raised and lowered or otherwise retractable embodiment is flush with a surface of a parking place.

8 Claims, 2 Drawing Sheets

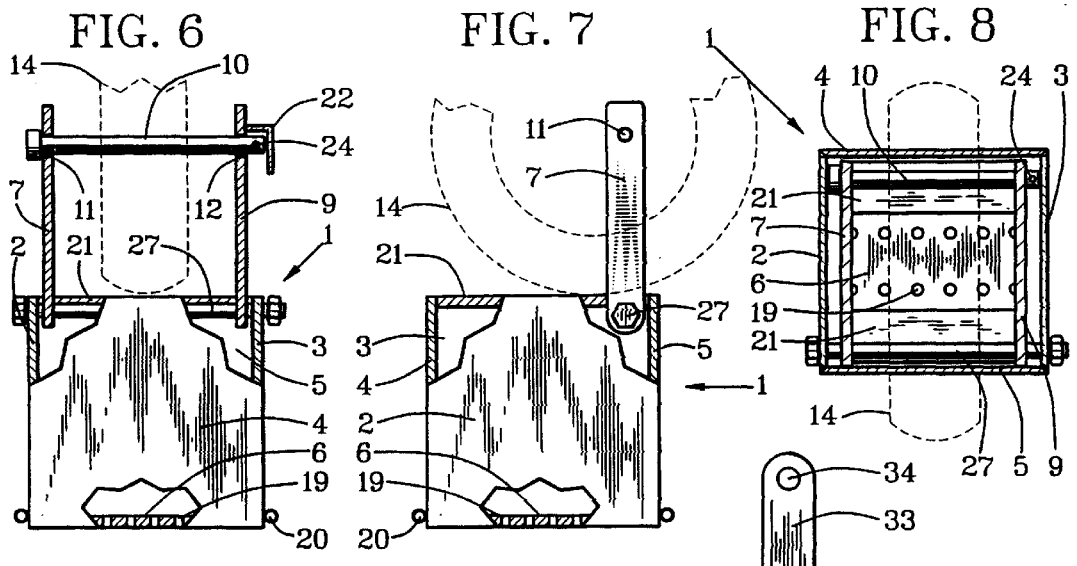
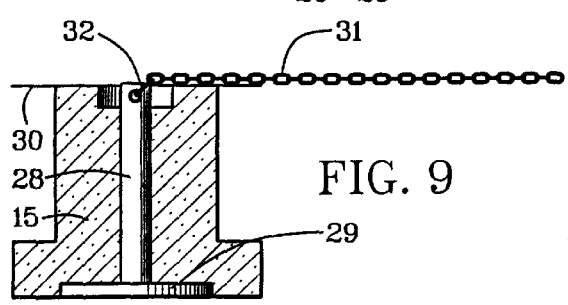
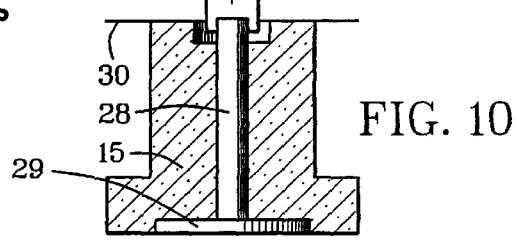
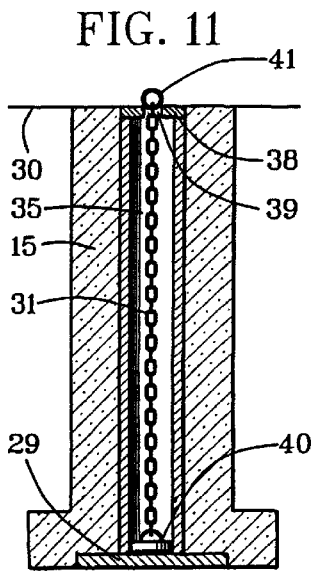
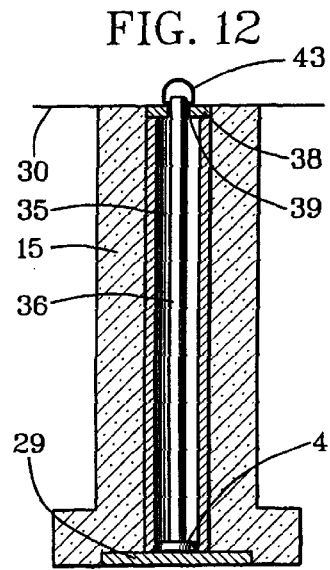
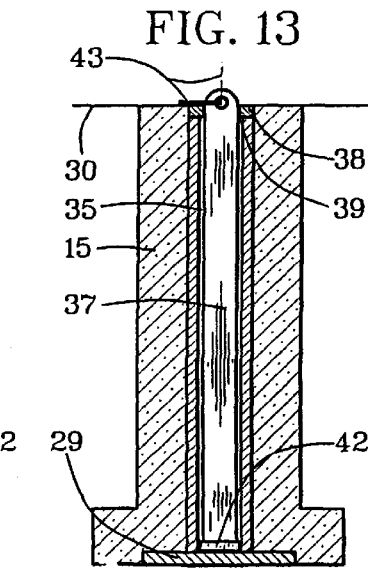

ANTITHEFT MOTOR VEHICLE ANCHOR AND METHOD

BACKGROUND OF THE INVENTION

1. Field of the Invention

This invention relates to prevention of theft of vehicles and in particular to anchoring wheels, axles or frames of vehicles to a land anchor to prevent their theft from parking places such as driveways, parking lots and motorcycle stands.

2. Relation To Prior Art

A wide variety of wheel-locking attachments are described in patent documents, in motor-vehicle literature and otherwise known to exist. None, however, are anchors which hold a vehicle wheel or other part of a vehicle to a surface anchor to prevent its theft or unauthorized movement in a manner taught by this invention. Most wheel-locking attachments are physical obstructions to wheel rotation or rotation-preventive connection of a wheel to a vehicle. With present vehicle carriers, existing locking systems are inadequate protection against theft of motor vehicles, particularly motorcycles.

SUMMARY OF THE INVENTION

In light of need for improvement in prevention of theft of motor vehicles, particularly motorcycles, objects of this invention are to provide an antitheft motor-vehicle anchor which:

Can be positioned in private and commercial parking places to prevent theft or unauthorized removal of motor vehicles, including vehicular units such as trailers and sidecars;

Can be used as a locking motorcycle stand;

Can lock to frames and axles in addition to wheels of all types of motor vehicles and vehicular units; and Prevents motor vehicles and vehicular units from being carried away without authorization, even though ignition-locked or wheel-locked.

This invention accomplishes these and other objectives with an antitheft motor-vehicle anchor that is affixed immovably to a surface position proximate a parking place and has a break-resistant connecter that is lockable to a wheel, frame and/or axle of a motor vehicle or vehicular unit to prevent its theft by being carried, towed or pushed away. The break-resistant connector can be retractable or otherwise raised to and lowered from or optionally fixed in a locking or clamping position. Either a fixed or a retractably raised and lowered embodiment can be used as a locking motorcycle stand. A raised and lowered or otherwise retractable embodiment is flush with a surface of a parking place.

BRIEF DESCRIPTION OF DRAWINGS

This invention is described by appended claims in relation to description of a preferred embodiment with reference to the following drawings which are described briefly as follows:

FIG. 6 is a partially cutaway end view of a box-attachment embodiment with cross-hinged attachment plates pivoted up in a use mode;

FIG. 7 is a partially cutaway end view of a box-attachment embodiment with cross-hinged attachment plates pivoted up in a use mode;

FIG. 8 is a top view of a box-attachment embodiment with cross-hinged attachment plates pivoted down in a non-use mode;

FIG. 9 is a partially cutaway elevation view of a fixed-attachment embodiment with a chain attached for a break-resistant fastener attachable to vehicles;

FIG. 10 is a partially cutaway elevation view of a fixed-attachment embodiment with a plate attached for a break-resistant fastener attachable to vehicles;

FIG. 11 is a partially cutaway elevation view of an anchor-cavity embodiment having a chain for a break-resistant fastener retracted in the anchor cavity;

FIG. 12 is a partially cutaway elevation view of an anchor-cavity embodiment having an anchor rod for a break-resistant fastener retracted in the anchor cavity; and FIG. 13 is a partially cutaway elevation view of an anchor-cavity embodiment having an anchor bar for a break-resistant fastener retracted in the anchor cavity.

DESCRIPTION OF PREFERRED EMBODIMENTS

Figure 1:
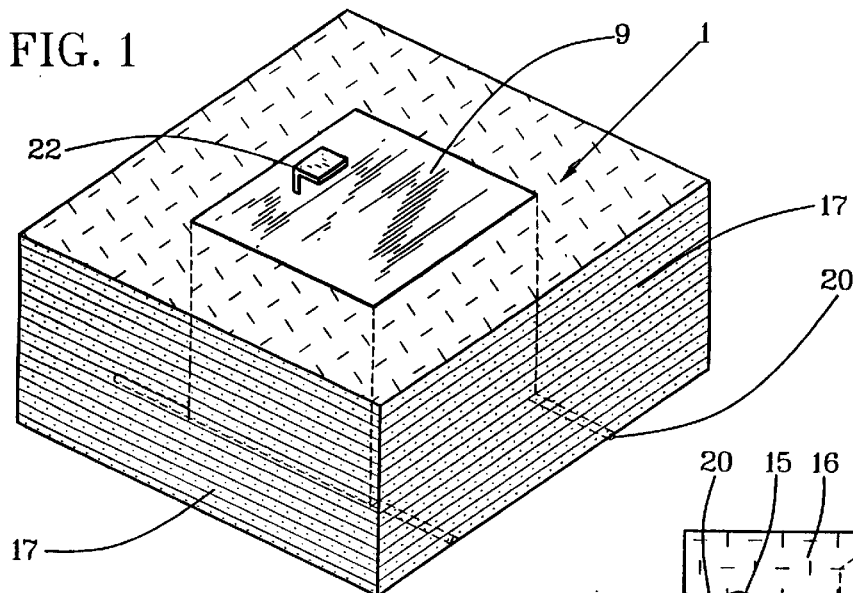
FIG. 1 is a perspective view of a box-attachment embodiment with linearly hinged attachment plates pivoted down in a non-use mode.
Figure 3:
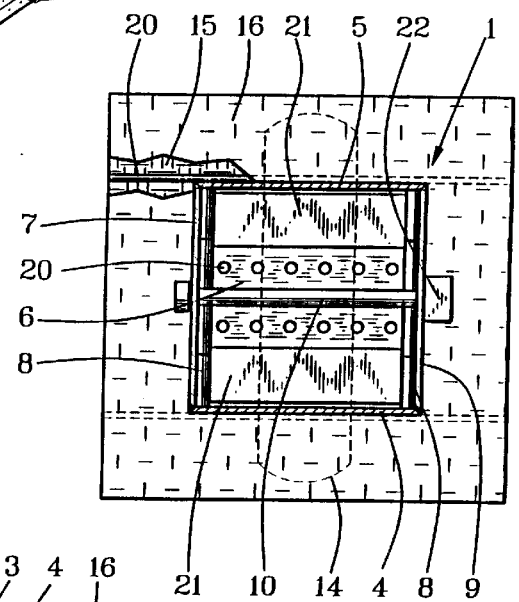
FIG. 3 is a partially cutaway top view of the FIG. 2 illustration.
Figure 2:
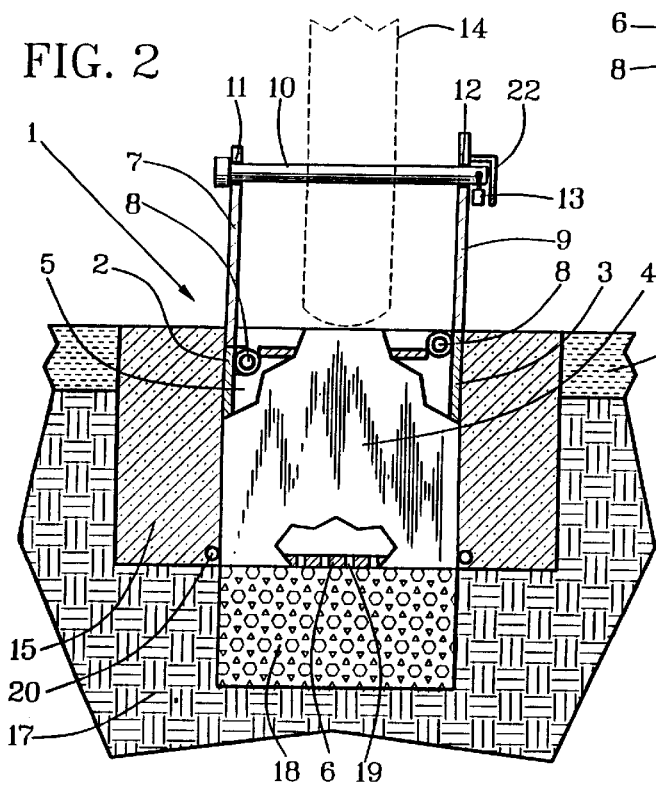
FIG. 2 is a partially cutaway end view of a box-attachment embodiment with linearly hinged attachment plates pivoted up in a use mode.

Reference is made first to FIGS. 1–3 of the drawings. A box-attachment embodiment has a metal box 1 as an anchor base for a motor-vehicle anchor that is immovably attached to a vehicle parking place. The metal box 1 has a first side 2, a second side 3, a front side 4, a back side 5 and a bottom 6. A first attachment plate 7 is hinged linearly to the first side 2 with a linear bolt hinge 8. A second attachment plate 9 is hinged linearly to the second side 3 with a separate linear bolt hinge 8.

The first attachment plate 7 and the second attachment plate 9 provide a lid covering for the metal box 1 when pivoted down to a non-use mode as depicted in FIG. 1. Pivoted up to a use mode as depicted in FIGS. 2-3, the first attachment plate 7 and the second attachment plate 9 are part of a securely break-resistant fastener. A lock pin 10 is inserted through a first lock-pin orifice 11 in the first attachment plate 7, passed selectively over and/or through a select part of a motor vehicle and then inserted through a second lock-pin orifice 12. There a padlock 13 or other locking device can be locked onto the lock pin 10 to complete the break-resistant fastener.

The lock pin 10 is proximate a distal portion of a break-resistant fastener. The attachment plates 7 and 9 are proximate a proximal portion of the break-resistant fastener where attached hingedly to the sides 2 and 3 of the metal box 1. A select portion of a motor vehicle to which the lock pin 10 is attachable can be a wheel, an axle, a portion of vehicular frame, a portion of a drive train, some other relatively immovable portion or a combination of such portions of a vehicle as represented y a dashed-line outline of a vehicle wheel 14.

The metal box 1 is embedded in concrete 15 or other cementing material with a top surface flush with a top surface of either paving material 16 or earth 17 that is not paved. The bottom 6 of the metal box 1 can be positioned on drainage material 18 such as gravel and can have drainage orifices 19. The metal box 1 can be sized and shaped to receive the lock pin 10 in a non-use mode.

Reinforcement bars 20 can be attached to or passed through the metal box 1 for securely immovable attachment of the motor-vehicle anchor to the vehicle parking place.

Support plates 21 can be positioned proximate a top of the metal box 1 to prevent wheels 14 of vehicles from falling into it. The support plates 21 can be attached to the sides 2 and 3, to the sides 4 and 5 or to bottom extensions as designed to accommodate juxtaposed positioning of the first attachment plate 7 and the second attachment plate 9 when pivoted down for non-use mode. Positioning of linear bolt hinges 8 also must be accommodated for positioning of the support plates 21. A bridge base between either pairs of opposite sides is a preferable construction that leaves the metal box 1 most nearly empty and still accommodates juxtaposed positioning of the attachment plates 7 and 9.

Juxtaposed positioning of the attachment plates 7 and 9 with the second attachment plate 9 on top of the first attachment plate 7 can be accomplished with the first attachment plate 7 positioned lower and made shorter than the second attachment plate 9 as depicted in FIG. 2.

Referring to FIGS. 1–6, a padlock guard 22 can be affixed to the second attachment plate 9 at a position vertically above the second lock-pin orifice 12. The padlock guard 22 can be a section of angle iron with a base welded or otherwise attached permanently to the second attachment plate 9. A leg of the angle iron can extend sufficiently beyond the second lock-pin orifice 12 to cover a design portion of a padlock 13 to obstruct its unauthorized opening.

Figure 4:
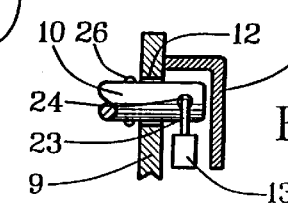
FIG. 4 is a sectional view of a covered padlock on a lock pin having a shackle orifice.
Figure 5:
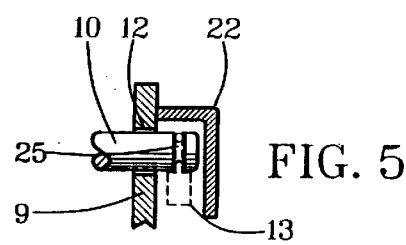
FIG. 5 is a sectional view of a covered padlock on a lock pin having a shackle channel.

A shackle receptacle for a padlock shackle 23 can be a shackle orifice 24 as depicted in FIG. 4 or a circumferential channel 25 that is sized to receive a design size and type of padlock shackles 23 as shown in FIG. 5.

As shown in FIG. 4, the lock pin 10o can have resister nibs 26 that can be either rigid to prevent or spring-loaded to resist designedly the passage of the lock pin 10 through the first lock-pin orifice 11.

Referring to FIGS. 6–8, a first attachment plate 7 and a second attachment plate 9 can be on a cross-bolt hinge to pivot between up and down positions. A cross-bolt hinge is represented by a cross bolt 27 in cross-bolt orifices at bases of the first attachment plate 7 and the second attachment plate 9. The cross bolt 27 is fastened to tops of the first side 2 and the second side 3 of the metal box 1. A fastener head and nut on the cross bolt 27 are representative of fastening means generally, not necessarily a preferred means. For use of a cross-bolt hinge, the attachment plates 7 and 9 are narrower than described in relation to FIGS. 1-3 and they pivot edgewise instead of sideways. The first attachment plate 7 can be the same length as the attachment plate 9 and the support plates 21 can be attached differently than described in relation to FIGS. 1–3 as illustrated for use of the cross-bolt hinge.

Referring to FIGS. 9-10, the motor-vehicle anchor can be a stationary rod 28 having an undercut flange 29 with which the stationary rod 28 is undercut-cemented to concrete 15 that is undercut-formed below a parking-place surface 30. The break-resistant fastener can be a flexible member such as a chain 31 that is attached to a top of the stationary rod 28 by such means as an attachment ring 32. To use this embodiment, a distal portion of the chain 31 is wrapped around, positioned on or inserted through a desired part of a motor vehicle and then locked to a proximal portion of the chain 31 proximate the attachment ring 32. Optionally, the distal portion of the chain 31 can be locked to the attachment ring 32 after being routed in a desired encompassing relationship to a select portion of the motor vehicle. A padlock or other locking means can be employed to lock the distal portion of the chain 31 to a proximal portion or to the attachment ring 32.

A singular attachment plate 33 shown in FIG. 10 can be attached to the stationary rod 28 instead of the chain 31 depicted in FIG. 9. The singular attachment plate 33 can be attached rigidly or pivotally to the stationary rod 28. An attachment aperture 34 in a distal end of the singular attachment plate 33 can be employed optionally for such break-resistant fastener as a chain 31 or for one end of a lock pin 10 described in relation to FIGS. 2–8.

A design plurality and grouping of stationary rods 28 with either a chain 31, a singular attachment plate 33 or other break-resistant fasteners can be employed. For example, positioning two stationary rods 28 side-by-side with singular attachment plates 33 that are rigidly attached can be a locking motorcycle stand if appropriately structured and positioned. Side-by-side singular attachment plates 33 that are pivotally attached to the stationary rods 28 can be used similarly to the first attachment plate 7 and second attachment plate 9 on the metal box 1 described in relation to FIGS. 1–8.

Referring to FIGS. 11–13, the motor-vehicle anchor can have at least one anchor cavity 35 that is undercut-encased in concrete 15 that is undercut-positioned a design distance in ground material beneath a surface 30 of a parking place. The anchor cavity 35 can be sized, shaped and structured to receive a break-resistant fastener that is flexible, such as a chain 31 shown in FIG. 11.

Optionally, the anchor cavity 35 can be sized, shaped and structured to receive a break-resistant fastener that is solidly cylindrical, such as an anchor rod 36 shown in FIG. 12, or solidly rectangular, such as an anchor bar 37 shown in FIG. 13. A cavity retainer plate 38 with a cavity aperture 39 is positioned in a top entrance to the anchor cavity 35.

The chain 31, the anchor rod 36 and the anchor bar 37 are each structured for a matching anchor cavity 35 with an inside periphery that is appropriately cylindrical or rectangular. The chain 31 has an anchor ring 40 on its proximal end and a lock ring 41 on its distal end. The anchor ring 40 and the lock ring 41 are structured too large to pass through the cavity aperture 39, such that the chain 31 is stored in the anchor cavity 35 and a desired portion of the chain 31 can be pulled selectively from the anchor cavity 35 to be locked onto a select portion of a vehicle with a fastener lock such as a padlock 13 having lock shackles 23 locked into links of the chain 31 without passage of the chain 31 into the anchor cavity 35 and without passage of the chain 31 out of the anchor cavity 35. A padlock 13 with padlock shackles 23 is described in relation to FIGS. 4-5.

The anchor rod 36 has an anchor ridge 42 on its proximal end and a lock retainer 43 on its distal end. The anchor ridge 42 and the lock retainer 43 on the anchor rod 36 are structured too large to pass through the cavity aperture 39, such that the anchor rod 36 is stored in the anchor cavity 35 and a desired portion of the anchor rod 36 can be lifted selectively from the anchor cavity 35 to be locked onto a select portion of a vehicle with a break-resistant fastener such as a chain 31 with a fastener lock such as a padlock 13 having a lock shackle 23 locked into links of the chain 31 without passage of the anchor rod 36 into the anchor cavity 35 and without passage of the anchor rod 36 out of the anchor cavity 35. The lock retainer 43 can be a ring that is loosely fit into an orifice on the distal end of the anchor rod 36.

The anchor bar 37 also has an anchor ridge 42 on its proximal end and a lock retainer 43. The anchor ridge 42 and the lock retainer 43 on the anchor bar 37 are structured too large to pass through the cavity aperture 39, such that the anchor bar 37 is stored in the anchor cavity 35 and a desired portion of the anchor bar 37 can be lifted selectively from the anchor cavity 35 to be locked onto a select portion of a vehicle with a break-resistant fastener such as a chain 31 with a fastener lock such as a padlock 13 having a lock shackle 23 locked into links of the chain 31 without passage of the anchor bar 37 into the anchor cavity 35 and without passage of the anchor bar 37 out of the anchor cavity 35. The lock retainer 43 can be a ring that is loosely fit into an orifice on the distal end of the anchor bar 37.

Like the embodiments of motor-vehicle anchors described in relation to FIGS. 9-10, those described in relation to FIGS. 11–13 can be positioned in tandem pairs or other pluralities for attachment to select portions of select types of motor vehicles. Tandem pairs of the embodiments described in relation to FIGS. 12-13 would be particularly suitable for locking motorcycle stands, while the embodiment described in relation to FIG. 11 would be suitable for tying down a motorcycle or other type of vehicle. All embodiments of this invention can be structured and positioned in accordance with design preferences as an antitheft motor-vehicle anchor.

A method for locking a motor vehicle to a parking place is provided by immovably attaching a motor-vehicle anchor such as described in relation to FIGS. 1–13 to a vehicle parking place, by fastening a design structural portion of the motor vehicle to the motor-vehicle anchor with a designedly break resistant fastener such as described in relation to FIGS. 1–13 and then by locking the designed break-resistant fastener to the motor vehicle as described in relation to FIGS. 1–13.

A new and useful antitheft motor-vehicle anchor having been described, all such foreseeable modifications, adaptations, substitutions of equivalents, mathematical possibilities of combinations of parts, pluralities of parts, applications and forms thereof as described by the following claims and not precluded by prior art are included in this invention.

What is claimed is:

1. An antitheft motor-vehicle anchor comprising:

a motor-vehicle anchor immovably attached to a vehicle parking place;

an immovable attachment of the motor-vehicle anchor to the vehicle parking place being sized, shaped and structured to prevent removal of the motor-vehicle anchor by unauthorized means;

a break-resistant fastener having a proximal portion attached to the motor-vehicle anchor and a distal portion attachable to a select portion of a motor vehicle;

the break-resistant fastener being sized, shaped and structured to prevent breakage by unauthorized means;

a lock fastener that is structured and positioned for locking the break-resistant fastener to the select portion of the motor vehicle;

the immovable attachment of the motor-vehicle anchor to the vehicle parking place has an anchor base with a reinforcement portion embedded in cement;

the anchor base is a metal box having reinforcement rods attached to a bottom of the metal box;

the metal box and the reinforcement rods are embedded in cement;

the metal box has a first attachment plate hinged to a first top side of the metal box and pivotal from a horizontal attitude vertically above the metal box to a vertical attitude that is designedly above the first top side of the metal box vertically;

the metal box has a second attachment plate hinged to a second top side of the metal box and pivotal from a horizontal attitude vertically above the metal box to a vertical attitude that is designedly above the second top side of the metal box vertically;

the first attachment plate and the second attachment plate are spaced apart designedly to allow positioning of a vehicle wheel between the first attachment plate and the second attachment plate in vertical attitudes;

the first attachment plate and the second attachment plate have lock-pin orifices sized and positioned to receive a lock pin that is inserted through a first lock-pin orifice, passed over a select portion of a vehicle from a first side of the select portion of the vehicle and then inserted through a second lock-pin orifice at a second side of the select portion of the vehicle; and a lock pin that is inserted in the first lock-pin orifice and in the second lock-pin orifice has a lock-pin head on a first end and a padlock receptacle on a second end.

2. An antitheft motor-vehicle anchor comprising:

a motor-vehicle anchor immovably attached to a vehicle parking place;

an immovable attachment of the motor-vehicle anchor to the vehicle parking place being sized, shaped and structured to prevent removal of the motor-vehicle anchor by unauthorized means;

a break-resistant fastener having a proximal portion attached to the motor-vehicle anchor and a distal portion attachable to a select portion of a motor vehicle;

the break-resistant fastener being sized, shaped and structured to prevent breakage by unauthorized means;

a lock fastener that is structured and positioned for locking the break-resistant fastener to the select portion of the motor vehicle;

the immovable attachment of the motor-vehicle anchor to the vehicle parking place has an anchor base with a reinforcement portion embedded in cement;

the anchor base is a metal box having reinforcement rods attached to a bottom of the metal box, the metal box and the reinforcement rods are embedded in cement;

the metal box has a first attachment plate hinged to a first top side of the metal box and pivotal from a horizontal attitude vertically above the metal box to a vertical attitude that is designedly above the first top side of the metal box vertically;

the metal box has a second attachment plate hinged to a second top side of the metal box and pivotal from a horizontal attitude vertically above the metal box to a vertical attitude that is designedly above the second top side of the metal box vertically;

the first attachment plate and the second attachment plate are spaced apart designedly to allow positioning of a vehicle wheel between the first attachment plate and the second attachment plate in vertical attitudes;

the first attachment plate and the second attachment plate have lock-pin orifices sized and positioned to receive a lock pin that is inserted through a first lock-pin orifice, passed over a select portion of a vehicle from a first side of the select portion of the vehicle and then inserted through a second lock-pin orifice at a second side of the select portion of the vehicle; and a lock pin that is inserted in the first lock-pin orifice and in the second lock-pin orifice has a lock-pin head on a first end and a padlock receptacle on a second end;

the metal box has support plates extended intermediate opposite sides proximate positions that are proximate a first hinge and a second hinge with which the first attachment plate and the second attachment plate are hinged to the metal box; and the support plates are structured and positioned to prevent entry of a vehicle wheel into the metal box when the first attachment plate and the second attachment plate are in vertical attitudes.

3. An antitheft motor-vehicle anchor comprising a motor-vehicle anchor immovably attached to a vehicle parking place;

an immovable attachment of the motor-vehicle anchor to the vehicle parking place being sized, shaped and structured to prevent removal of the motor-vehicle anchor by unauthorized means;

a break-resistant fastener having a proximal portion attached to the motor-vehicle anchor and a distal portion attachable to a select portion of a motor vehicle;

the break-resistant fastener being sized, shaped and structured to prevent breakage by unauthorized means;

a lock fastener that is structured and positioned for locking the break-resistant fastener to the select portion of the motor vehicle;

the immovable attachment of the motor-vehicle anchor to the vehicle parking place has an anchor base with a reinforcement portion embedded in cement;

the anchor base is a metal box having reinforcement rods attached to a bottom of the metal box;

the metal box and the reinforcement rods are embedded in cement;

the metal box has a first attachment plate hinged to a first top side of the metal box and pivotal from a horizontal attitude vertically above the metal box to a vertical attitude that is designedly above the first top side of the metal box vertically;

the metal box has a second attachment plate hinged to a second top side of the metal box and pivotal from a horizontal attitude vertically above the metal box to a vertical attitude that is designedly above the second top side of the metal box vertically;

the first attachment plate and the second attachment plate are spaced apart designedly to allow positioning of a vehicle wheel between the first attachment plate and the second attachment plate in vertical attitudes;

the first attachment plate and the second attachment plate have lock-pin orifices sized and positioned to receive a lock pin that is inserted through a first lock-pin orifice, passed over a select portion of a vehicle from a first side of the select portion of the vehicle and then inserted through a second lock-pin orifice at a second side of the select portion of the vehicle; a lock pin that is inserted in the first lock-pin orifice and in the second lock-pin orifice has a lock-pin head on a first end and a padlock receptacle on a second end;

the metal box has support plates extended intermediate opposite sides proximate positions that are proximate a first hinge and a second hinge with which the first attachment plate and the second attachment plate are hinged to the metal box;

the support plates are structured and positioned to prevent entry of a vehicle wheel into the metal box when the first attachment plate and the second attachment plate are in vertical attitudes; the metal box is adapted to be positioned on a drainage bed under a bottom of the metal box; and the bottom of the metal box has drainage orifices through which liquid entering the metal box can be drained into the drainage bed.

4. An antitheft motor-vehicle anchor comprising:

a motor-vehicle anchor immovably attached to a vehicle parking place;

an immovable attachment of the motor-vehicle anchor to the vehicle parking place being sized, shaped and structured to prevent removal of the motor-vehicle anchor by unauthorized means;

a break-resistant fastener having a proximal portion attached to the motor-vehicle anchor and a distal portion attachable to a select portion of a motor vehicle;

the break-resistant fastener being sized, shaped and structured to prevent breakage by unauthorized means;

a lock fastener that is structured and positioned for locking the break-resistant fastener to the select portion of the motor vehicle;

the immovable attachment of the motor-vehicle anchor to the vehicle parking place has an anchor base with a reinforcement portion embedded in cement;

the anchor base is a metal box having reinforcement rods attached to a bottom of the metal box;

the metal box and the reinforcement rods are embedded in cement;

the metal box has a first attachment plate hinged to a first top side of the metal box and pivotal from a horizontal attitude vertically above the metal box to a vertical attitude that is designedly above the first top side of the metal box vertically;

the metal box has a second attachment plate hinged to a second top side of the metal box and pivotal from a horizontal attitude vertically above the metal box to a vertical attitude that is designedly above the second top side of the metal box vertically;

the first attachment plate and the second attachment plate are spaced apart desinedly to allow positioning of a vehicle wheel between the first attachment plate and the second attachment plate in vertical attitudes;

the first attachment plate and the second attachment plate have lock-pin orifices sized and positioned to receive a lock pin that is inserted through a first lock-pin orifice, passed over a select portion of a vehicle from a first side of the select portion of the vehicle and then inserted through a second lock-pin orifice at a second side of the select portion of the vehicle;

a lock pin that is inserted in the first lock-pin orifice and in the second lock-pin orifice has a lock-pin head on a first end and a padlock receptacle on a second end;

the metal box has support plates extended intermediate opposite sides proximate positions that are proximate a first hinge and a second hinge with which the first attachment plate and the second attachment plate are hinged to the metal box;

the support plates are structured and positioned to prevent entry of a vehicle wheel into the metal box when the first attachment plate and the second attachment plate are in vertical attitudes;

the metal box is adapted to be positioned on a drainage bed under a bottom of the metal box; the bottom of the metal box has drainage orifices through which liquid entering the metal box can be drained into the drainage bed;

the first attachment plate and the second attachment plate are sized and shaped to be positioned at opposite sides of a portion of a frame of a vehicle;

lock-pin orifices are sized and positioned in the first attachment plate and in the second attachment plate to receive a lock pin that has been inserted through a first lock-pin orifice positioned on a retainment side of a portion of a frame of a vehicle and inserted through the second lock-pin orifice.

5. An antitheft motor-vehicle anchor comprising:

a motor-vehicle anchor immovably attached to a vehicle parking place;

an immovable attachment of the motor-vehicle anchor to the vehicle parking place being sized, shaped and structured to prevent removal of the motor-vehicle anchor by unauthorized means;

a break-resistant fastener having a proximal portion attached to the motor-vehicle anchor and a distal portion attachable to a select portion of a motor vehicle;

the break-resistant fastener being sized, shaped and structured to prevent breakage by unauthorized means;

a lock fastener that is structured and positioned for locking the break-resistant fastener to the select portion of the motor vehicle;

the immovable attachment of the motor-vehicle anchor to the vehicle parking place has an anchor base with a reinforcement portion embedded in cement;

the anchor base is a metal box having reinforcement rods attached to a bottom of the metal box;

the metal box and the reinforcement rods are embedded in cement;

the metal box has a first attachment plate hinged to a first top side of the metal box and pivotal from a horizontal attitude vertically above the metal box to a vertical attitude that is designedly above the first top side of the metal box vertically;

the metal box has a second attachment plate hinged to a second top side of the metal box and pivotal from a horizontal attitude vertically above the metal box to a vertical attitude that is designedly above the second top side of the metal box vertically;

the first attachment plate and the second attachment plate are spaced apart designedly to allow positioning of a vehicle wheel between the first attachment plate and the second attachment plate in vertical attitudes;

the first attachment plate and the second attachment plate have lock-pin orifices sized and positioned to receive a lock pin that is inserted through a first lock-pin orifice passed over a select portion of a vehicle from a first side of the select portion of the vehicle and then inserted through a second lock-pin orifice at a second side of the select portion of the vehicle; a lock pin that is inserted in the first lock-pin orifice and in the second lock-pin orifice has a lock-pin head on a first end and a padlock receptacle on a second end;

the metal box has support plates extended intermediate opposite sides proximate positions that are proximate a first hinge and a second hinge with which the first attachment plate and the second attachment plate are hinged to the metal box;

the support plates are structured and positioned to prevent entry of a vehicle wheel into the metal box when the first attachment plate and the second attachment plate are in vertical attitudes; the metal box is adapted to be positioned on a drainage bed under a bottom of the metal box; and the bottom of the metal box has drainage orifices through which liquid entering the metal box can be drained into the drainage bed; the metal box is sized and shaped to receive the lock pin in a storage mode.

6. An antitheft motor-vehicle comprising:

a motor-vehicle anchor immovably attached to a vehicle parking place;

an immovable attachment of the motor-vehicle anchor to the vehicle parking place being sized, shaped and structured to prevent removal of the motor-vehicle anchor by unauthorized means;

a break-resistant fastener having a proximal portion attached to the motor-vehicle anchor and a distal portion attachable to a select portion of a motor vehicle;

the break-resistant fastener being sized, shaped and structured to prevent breakage by unauthorized means;

a lock fastener that is structured and positioned for locking the break-resistant fastener to the select portion of the motor vehicle;

the immovable attachment of the motor-vehicle anchor to the vehicle parking place has an anchor base with a reinforcement portion embedded in cement;

the anchor base is a metal box having reinforcement rods attached to a bottom of the metal box;

the metal box and the reinforcement rods are embedded in cement;

the metal box has a first attachment plate hinged to a first top side of the metal box and pivotal from a horizontal attitude vertically above the metal box to a vertical attitude that is designedly above the first top side of the metal box vertically;

the metal box has a second attachment plate hinged to a second top side of the metal box and pivotal from a horizontal attitude vertically above the metal box to a vertical attitude that is designedly above the second top side of the metal box vertically;

the first attachment plate and the second attachment plate are spaced apart designedly to allow positioning of a vehicle wheel between the first attachment plate and the second attachment plate in vertical attitudes;

the first attachment plate and the second attachment plate have lock-pin orifices sized and positioned to receive a lock pin that is inserted through a first lock-pin orifice, passed over a select portion of a vehicle from a first side of the select portion of the vehicle and then inserted through a second lock-pin orifice at a second side of the select portion of the vehicle;

a lock pin that is inserted in the first lock-pin orifice and in the second lock-pin orifice has a lock-pin head on a first end and a padlock receptacle on a second end;

the metal box has support plates extended intermediate opposite sides proximate positions that are proximate a first hinge and a second hinge with which the first attachment plate and the second attachment plate are hinged to the metal box;

the support plates are structured and positioned to prevent entry of a vehicle wheel into the metal box when the first attachment plate and the second attachment plate are in vertical attitudes; the metal box is adapted to be positioned on a drainage bed under a bottom of the metal box; and the bottom of the metal box has drainage orifices through which liquid entering the metal box can be drained into the drainage bed;

the padlock receptacle is a shackle orifice that is sized to receive padlock shackles.

7. An antitheft motor-vehicle anchor comprising:

a motor-vehicle anchor immovably attached to a vehicle parking place;

an immovable attachment of the motor-vehicle anchor to the vehicle parking place being sized, shaped and structured to prevent removal of the motor-vehicle anchor by unauthorized means;

a break-resistant fastener having a proximal portion attached to the motor-vehicle anchor and a distal portion attachable to a select portion of a motor vehicle;

the break-resistant fastener being sized, shaped and structured to prevent breakage by unauthorized means;

a lock fastener that is structured and positioned for locking the break-resistant fastener to the select portion of the motor vehicle;

the immovable attachment of the motor-vehicle anchor to the vehicle parking place has an anchor base with a reinforcement portion embedded in cement;

the anchor base is a metal box having reinforcement rods attached to a bottom of the metal box;

the metal box and the reinforcement rods are embedded in cement;

the metal box has a first attachment plate hinged to a first top side of the metal box and pivotal from a horizontal attitude vertically above the metal box to a vertical attitude that is designedly above the first top side of the metal box vertically;

the metal box has a second attachment plate hinged to a second top side of the metal box and pivotal from a horizontal attitude vertically above the metal box to a vertical attitude that is designedly above the second top side of the metal box vertically;

the first attachment plate and the second attachment plate are spaced apart designedly to allow positioning of a vehicle wheel between the first attachment plate and the second attachment plate in vertical attitudes;

the first attachment plate and the second attachment plate have lock-pin orifices sized and positioned to receive a lock pin that is inserted through a first lock-pin orifice, passed over a select portion of a vehicle from a first side of the select portion of the vehicle and then inserted through a second lock-pin orifice at a second side of the select portion of the vehicle;

a lock pin that is inserted in the first lock-pin orifice and in the second lock-pin orifice has a lock-pin head on a first end and a padlock receptacle on a second end;

the metal box has support plates extended intermediate opposite sides proximate positions that are proximate a first hinge and a second hinge with which the first attachment plate and the second attachment plate are hinged to the metal box; the support plates are structured and positioned to prevent entry of a vehicle wheel into the metal box when the first attachment plate and the second attachment plate are in vertical attitudes;

the metal box is adapted to be positioned on a drainage bed under a bottom of the metal box; and the bottom of the metal box has drainage orifices through which liquid entering the metal box can be drained into the drainage bed;

the padlock receptacle is a circumfrential channel that is sized to receive padlock shackles.

8. An antitheft motor-vehicle anchor comprising:

a motor-vehicle anchor immovably attached to a vehicle parking place;

an immovable attachment of the motor-vehicle anchor to the vehicle parking place being sized, shaped and structured to prevent removal of the motor-vehicle anchor by unauthorized means;

a break-resistant fastener having a proximal portion attached to the motor-vehicle anchor and a distal portion attachable to a select portion of a motor vehicle;

the break-resistant fastener being sized, shaped and structured to prevent breakage by unauthorized means;

a lock fastener that is structured and positioned for locking the break-resistant fastener to the select portion of the motor vehicle;

the immovable attachment of the motor-vehicle anchor to the vehicle parking place has an anchor base with a reinforcement portion embedded in cement;

the anchor base is a metal box having reinforcement rods attached to a bottom of the metal box;

the metal box and the reinforcement rods are embedded in cement;

the metal box has a first attachment plate hinged to a first top side of the metal box and pivotal from a horizontal attitude vertically above the metal box to a vertical attitude that is designedly above the first top side of the metal box vertically;

the metal box has a second attachment plate hinged to a second top side of the metal box and pivotal from a horizontal attitude vertically above the metal box to a vertical attitude that is designedly above the second top side of the metal box vertically;

the first attachment plate and the second attachment plate are spaced apart designedly to allow positioning of a vehicle wheel between the first attachment plate and the second attachment plate in vertical attitudes;

the first attachment plate and the second attachment plate have lock-pin orifices sized and positioned to receive a lock pin that is inserted through a first lock-pin orifice, passed over a select portion of a vehicle from a first side of the select portion of the vehicle and then inserted through a second lock-pin orifice at a second side of the select portion of the vehicle;

a lock pin that is inserted in the first lock-pin orifice and in the second lock-pin orifice has a lock-pin head on a first end and a padlock receptacle on a second end;

the metal box has support plates extended intermediate opposite sides proximate positions that are proximate a first hinge and a second hinge with which the first attachment plate and the second attachment plate are hinged to the metal box;

the support plates are structured and positioned to prevent entry of a vehicle wheel into the metal box when the first attachment plate and the second attachment plate are in vertical attitudes;

the metal box is adapted to be positioned on a drainage bed under a bottom of the metal box; and the bottom of the metal box has drainage orifices through which liquid entering the metal box can be drained into the drainage bed;

the second attachment plate has an angled padlock guard extended vertically from a side of a lock pin orifice; and the angled padlock guard is structured and positioned to cover a portion of a padlock that is positioned on the locked pin.

* * * * *